(12) United States Patent
Albert et al.

(10) Patent No.: US 11,499,460 B2
(45) Date of Patent: Nov. 15, 2022

(54) APPARATUS FOR ADDING A LIQUID REDUCING AGENT TO THE EXHAUST GAS FROM AN INTERNAL COMBUSTION ENGINE AND MOTOR VEHICLE

(71) Applicant: MAN Truck & Bus SE, Munich (DE)

(72) Inventors: Herbert Albert, Erlangen (DE); Ghaith Arfaoui, Nuremberg (DE)

(73) Assignee: MAN TRUCK & BUS SE, Munich (DE)

( * ) Notice: Subject to any disclaimer, the term of this patent is extended or adjusted under 35 U.S.C. 154(b) by 0 days.

(21) Appl. No.: 17/273,093

(22) PCT Filed: Sep. 25, 2019

(86) PCT No.: PCT/EP2019/075895
§ 371 (c)(1),
(2) Date: Mar. 3, 2021

(87) PCT Pub. No.: WO2020/064853
PCT Pub. Date: Apr. 2, 2020

(65) Prior Publication Data
US 2021/0340896 A1 Nov. 4, 2021

(30) Foreign Application Priority Data
Sep. 28, 2018 (DE) .......................... 102018124025.2

(51) Int. Cl.
*F01N 3/20* (2006.01)
*F01N 3/28* (2006.01)
(52) U.S. Cl.
CPC ......... *F01N 3/2066* (2013.01); *F01N 3/2892* (2013.01); *F01N 2240/20* (2013.01);
(Continued)
(58) Field of Classification Search
CPC combination set(s) only.
See application file for complete search history.

(56) References Cited

U.S. PATENT DOCUMENTS 9,957,870 B2 * 5/2018 Stelzer ................. B01F 5/0062
10,767,536 B2 * 9/2020 Morey ............. B01F 25/45211
(Continued)

FOREIGN PATENT DOCUMENTS

DE         4203807 A1    8/1993
DE    112012000035       9/2013
(Continued)

OTHER PUBLICATIONS

German Search Report issued in German Patent Application No. DE102018124025.2 dated May 3, 2019, 7 pages. No English translation available.
(Continued)

*Primary Examiner* — Binh Q Tran
(74) *Attorney, Agent, or Firm* — Weber Rosselli & Cannon LLP

(57) ABSTRACT

The present disclosure relates to an apparatus for adding a liquid reducing agent, preferably an aqueous urea solution, to the exhaust gas from an internal combustion engine. The apparatus according to the present disclosure comprises a dosing device arranged in an exhaust line of the internal combustion engine, which device is designed to generate a reducing agent spray by means of an injector. The apparatus furthermore comprises a swirl generator device, designed as a hollow body, preferably a hollow cylinder, about a longitudinal axis, which has a first end facing the injector and a second end facing away from the injector. The shell surface L of the swirl generator device, designed as a hollow body, furthermore comprises at least one exhaust inlet opening extending substantially in the longitudinal direction and a guide element, attached adjacent to the exhaust inlet opening and covering the exhaust inlet opening in the interior of the swirl generator device, at least in part at a distance, for deflecting an exhaust gas flow. According to the present
(Continued)

disclosure, the guide element is closed in the direction of the first end of the swirl generator device, by means of a wall or connection to the shell surface, for example, and open in the direction of the second end of the swirl generator device. The present disclosure furthermore relates to a motor vehicle, preferably a utility vehicle, having a corresponding apparatus.

20 Claims, 8 Drawing Sheets

(52) U.S. Cl.
CPC ...... *F01N 2470/02* (2013.01); *F01N 2470/30* (2013.01); *F01N 2610/02* (2013.01); *F01N 2610/1453* (2013.01)

(56) References Cited

U.S. PATENT DOCUMENTS

| | | | | |
|---|---|---|---|---|
| 10,960,366 | B2* | 3/2021 | Whitten | ................ B01F 5/0451 |
| 2014/0230411 | A1* | 8/2014 | De Rudder | ........... F01N 3/2892 |
| | | | | 60/274 |
| 2014/0298781 | A1 | 10/2014 | Naga et al. | |
| 2014/0325967 | A1* | 11/2014 | Kimura | ................ B01F 5/0065 |
| | | | | 60/286 |
| 2015/0040537 | A1* | 2/2015 | Hicks | ................ B01F 3/04049 |
| | | | | 60/273 |
| 2016/0265409 | A1* | 9/2016 | Puschel | ................ B01D 53/94 |
| 2017/0082004 | A1* | 3/2017 | Brandl | ................ B01F 5/0057 |
| 2017/0342888 | A1* | 11/2017 | Noren, IV | .......... B01F 3/04049 |

FOREIGN PATENT DOCUMENTS

| | | |
|---|---|---|
| DE | 112012000021 | 2/2015 |
| DE | 112015001958 | 1/2017 |
| DE | 102017101749 A1 | 4/2017 |
| DE | 102016004333 A1 | 10/2017 |
| EP | 3067529 A1 | 9/2016 |
| JP | 2009150338 A | 7/2009 |

OTHER PUBLICATIONS

PCT Search Report and Written Opinion issued in PCT/EP2019/075895 dated Dec. 5, 2019, 14 pages. No English translation available.

* cited by examiner

APPARATUS FOR ADDING A LIQUID REDUCING AGENT TO THE EXHAUST GAS FROM AN INTERNAL COMBUSTION ENGINE AND MOTOR VEHICLE

BACKGROUND

Technical Field

The present disclosure relates to an apparatus for admixing a liquid reducing agent, preferably an aqueous urea solution, to the exhaust gas of an internal combustion engine. The present disclosure furthermore relates to a motor vehicle, preferably a utility vehicle, having a corresponding apparatus.

Description of Related Art

In order to reduce the fraction of nitrogen oxides from the exhaust gas of internal combustion engines, in particular diesel internal combustion engines, the method of selective catalytic reduction (SCR) has become established in the utility vehicle sector. Here, firstly, ammonia or a substance which releases ammonia in the exhaust-gas flow, for example aqueous urea solution, is added as reducing agent to the exhaust gas, which reducing agent subsequently reacts, in the SCR catalytic converter, with the nitrogen oxides present in the exhaust gas to form non-hazardous products (predominantly nitrogen and water). In order here to firstly attain a high conversion rate of the reaction and secondly avoid deposits of the reducing agent in the exhaust-gas tract, it is advantageous here for the reducing agent to be distributed as uniformly as possible in the exhaust gas. Correspondingly, in this context, various mixing or turbulence generating apparatuses are known in the prior art which are arranged in the exhaust-gas tract, preferably in the region of the reducing agent inlet, and which are intended to effect the best possible mixing of exhaust gas and reducing agent.

For example, DE 11 2012 000 035 T5 discloses such a turbulence generating apparatus for the exhaust-gas aftertreatment of a drive or internal combustion engine, comprising a mixing pipe which is positioned downstream of an injector for injecting a reducing agent, which mixing pipe is provided with a perforation over a large area in partial regions on the circumference. During the operation of the internal combustion engine, exhaust gas can enter the mixing pipe through the perforation in the pipe shell and, in the interior, form a spiral-shaped flow which is intended to promote the mixing of exhaust gas with reducing agent injected into the mixing pipe.

A disadvantage of the previous solutions is however that the flow that forms in the interior of the mixing pipe is greatly influenced by the external flow incident on the mixing pipe and/or by the geometry of the exhaust-gas tract surrounding the mixing pipe. It is correspondingly possible, depending on the operating point of the internal combustion engine, for different and often asymmetrical flow distributions to form in the mixing pipe. This can then in turn lead to undesired deposits of reducing agent in flow-stabilized regions. Furthermore, a non-uniform flow through the mixing pipe can also result in inhomogeneous warming of the mixing pipe, which promotes the formation of cold wall regions, which can then act as cold traps for the reducing agent.

Correspondingly, it is an object of the present disclosure to provide an apparatus for admixing a liquid reducing agent to the exhaust gas of an internal combustion engine, with which the disadvantages of the previous solutions can be avoided. In particular, it is an object of the present disclosure to provide a corresponding apparatus which, irrespective of the incident flow of exhaust gas and/or the operating point of the internal combustion engine which generates exhaust gas, can effect an as homogeneous as possible mixing action and thus prevents deposits of reducing agent in the exhaust-gas tract.

SUMMARY

Said objects are achieved according to the present disclosure by means of an apparatus and a motor vehicle having the features of the independent claims. Advantageous embodiments and applications are the subject of the independent claims and will be discussed in more detail in the following description, in part with reference to the figures.

The apparatus according to the present disclosure for admixing a liquid reducing agent to the exhaust gas of an internal combustion engine comprises, in a manner known per se, a metering device which is arranged in an exhaust gas tract of the internal combustion engine and which is configured to generate a—preferably rotationally symmetrical—reducing agent spray jet by means of an injector, for example in the form of a jet nozzle. The liquid reducing agent may be pure water-free ammonia, aqueous ammonia, an aqueous solution of an ammonia precursor substance (for example urea, guanidinium formiate, ammonium carbamate and/or ammonium formiate) and/or some other liquid that is suitable as reducing agent for SCR catalysis.

The apparatus furthermore comprises—likewise in a manner known per se—a swirl generating device which is in the form of a hollow body, preferably in the form of a hollow cylinder and/or hollow frustum, about a longitudinal axis and which has a first end facing toward the injector and a second end averted from the injector. By means of the swirl generating device, which can also be referred to as swirl-imparting device or turbulence generating device, a swirl can be imparted to the exhaust gas or to an exhaust-gas flow. The swirl generating device is in this case preferably positioned downstream of the injector and/or arranged such that the injector can spray the reducing agent spray jet into the interior of the swirl generating device.

The lateral surface or the shell of the swirl generating device in the form of a hollow body furthermore comprises at least one exhaust-gas inlet opening extending substantially in a longitudinal direction and one guide element which is fitted adjacent to the exhaust-gas inlet opening and which at least partially covers the exhaust-gas inlet opening in a spaced-apart manner in the interior of the swirl generating device and which serves for diverting an exhaust-gas flow. In this context, the guide element may also be referred to as guide plate, impingement wall, swirl generator, rib, lip and/or gill, and can be understood as a component which belongs to or is assigned to the exhaust-gas inlet opening, that is to say the exhaust-gas inlet opening and guide element can be regarded as a functionally interacting unit.

According to the present disclosure, it is now provided that the guide element is closed in the direction of the first end of the swirl generating device, for example by means of a wall or connection to the lateral surface, and is open in the direction of the second end of the swirl generating device. The expressions "open" and "closed" can be understood here to mean that a passage of exhaust gas through the exhaust-gas inlet opening from or in the corresponding direction is substantially possible or not possible respectively. By means of this design of the guide element and in interaction with the exhaust-gas inlet opening, it is thus the case that, when the exhaust-gas flow enters the interior of the swirl generating device through the exhaust-gas inlet opening, a homogeneous exhaust-gas flow is advantageously generated which is directed substantially tangentially and/or in the direction of the second end of the swirl generating device and which is as far as possible uninfluenced by the external incident flow of exhaust gas and/or the operating point of the internal combustion engine. Preferably, the swirl generating device generates symmetrical swirl about the longitudinal axis. It is particularly preferable here for the symmetry of the swirl to remain constant over the entire length of the swirl generating device, that is to say also further downstream. This advantageously promotes the uniform propagation and evaporation and the mixing of exhaust gas and reducing agent and simultaneously prevents reducing agent deposits.

According to a first aspect of the present disclosure, the preferably cantilevered guide element may in this case be connected to the lateral surface only along one longitudinal edge and one transverse edge, facing toward the first end of the swirl generating device, of the exhaust-gas inlet opening, in order to thus, when the exhaust-gas flow enters the interior of the swirl generating device through the exhaust-gas inlet opening, generate there—that is to say in the interior of the swirl generating device—an exhaust-gas flow which is directed substantially tangentially and/or in the direction of the second end of the swirl generating device. The expression "longitudinal edge" can be regarded here as an edge of the exhaust-gas inlet opening which extends substantially along the longitudinal direction, and the expression "transverse edge" can be regarded as an edge of the exhaust-gas inlet opening extending substantially along the circumferential direction. Correspondingly, in this context, the guide element can also be referred to as a roof which is fastened on two sides and/or as a hood which is open on two sides. Preferably, in this case, the connecting region between guide element and lateral surface substantially has an L-shaped form. The advantage of this aspect lies in the fact that, in this way, in the interior of the swirl generating device, a flow which is expedient for the mixing of exhaust gas and reducing agent can be generated in a simple manner, which as far as possible avoids deposits of reducing agent.

According to a further aspect of the present disclosure, the guide element may furthermore comprise a first wall region which at least partially, preferably completely, covers the exhaust-gas inlet opening in a spaced-apart manner and/or roofs the exhaust-gas inlet opening in a spaced-apart manner. Here, the expressions "cover" or "roof" may be understood to mean that the first wall region prevents a direct line of sight in a radial direction from the longitudinal axis of the swirl generating device to the exhaust-gas inlet opening. Correspondingly, in this way, an inflow of the exhaust-gas flow into the swirl generating device in a radial direction can be prevented, which advantageously leads, in the interior of the swirl generating device, to the formation of a flow directed substantially in a circumferential direction or tangentially. Furthermore, the guide element may comprise a second wall region which connects the first wall region to the lateral surface in the direction of the first end of the swirl generating device and thus closes the guide element in that direction. Preferably, here, the closure is realized substantially in an axial direction of the swirl generating device. In this way, the exhaust-gas flow that enters is advantageously prevented from flowing back in the direction of the injector, and thus a possible accumulation of reducing agent in the region of the dosing device is substantially prevented. Furthermore, the reducing agent is advantageously prevented from being centrifuged out of the swirl generating device in a radial direction. Aside from the closure of the guide element in an axial direction, the second wall region may however also at least partially cover the exhaust-gas inlet opening in a spaced-apart manner.

According to one refinement, the second wall region may have a curvature and/or a bend. Furthermore or alternatively, the second wall region may also adjoin the first wall region at an angle not equal to 90°. By means of these features, it is advantageously ensured that, in the transition region between the first and second wall regions, there are no sharp-edged corners and/or flow-stabilized sinks that could cause an accumulation of reducing agent which impairs the function of the swirl generating device. Preferably, the second wall region may in this case have the form of an arc segment and/or have, proceeding from its fastening point on the lateral surface, a curvature averted from the injector.

According to a further aspect, the first wall region may have a first longitudinal portion facing toward the injector and have a second longitudinal portion averted from the injector. Here, the first longitudinal portion may have a greater spacing to the longitudinal axis of the swirl generating device in a radial direction, preferably by way of a step of the first wall region. In other words, the first wall region may, in a longitudinal direction, comprise at least one step. Preferably, the step that connects the two longitudinal portions is in this case rounded and/or "smooth", that is to say has no sharp-edged corners. The advantage of the step of the first wall region lies in the fact that, in this way, high swirl or centrifuging forces on the reducing agent spray jet can be avoided in the region of the first end of the swirl generating device, that is to say in the vicinity of the injector, and thus the risk of deposits of reducing agent can be reduced.

In one refinement of this aspect, a length, measured in a longitudinal direction, of the first longitudinal portion may be shorter than a length, measured in a longitudinal direction, of the second longitudinal portion. In other words, the first longitudinal portion may have a shorter longitudinal extent than the second longitudinal portion. Preferably, here, the length of the first longitudinal portion is less than half, particularly preferably less than one third, of the length of the second longitudinal portion. This aspect can advantageously also contribute to a reduction of centrifuging forces in the vicinity of the injector, and thus to a reduction of the risk of reducing agent deposits.

According to a further aspect of the present disclosure, the guide element may comprise, between the first and second longitudinal portions, two or more preferably rounded steps. Here, the individual steps may be of substantially identical and/or different design. Furthermore or alternatively, the guide element may also comprise, between the first and second longitudinal portions, further longitudinal portions which have a spacing to the longitudinal axis of the swirl generating device in a radial direction, which spacing differs from the spacing of the first and second longitudinal portions. This means in other words that the guide element may, in a longitudinal direction, have multiple steps, wherein the length of the individual longitudinal portions as measured in a longitudinal direction—including that of the first and second longitudinal portions—may be selected to differ. The advantage of this aspect lies in the fact that, in this way, an altogether "smooth" transition or profile of the guide element can be attained, in the case of which sudden changes in the radial spacing, which promote an accumulation of reducing agent, are avoided.

Furthermore, according to a further aspect of the present disclosure, the first wall region of the guide element may have a curved first transverse portion, which is connected to lateral surface, and a substantially straight second transverse portion which adjoins the first transverse portion. Here, the first transverse portion is preferably integrally formed on an edge region of the exhaust-gas inlet opening, and/or designed in the form of an arc segment. Here, the expression "transverse portion" can be understood to mean a portion of the first wall region extending substantially perpendicular to the longitudinal direction. In other words, the cross section of the first wall region perpendicular to the longitudinal direction may thus also comprise the first and second transverse section with the above-stated features. In this way, a simple and effective guide or swirl element is advantageously provided which, when exhaust gas impinges on the swirl generating device, can lead, in the interior of said swirl generating device, to the formation of a flow directed substantially in a circumferential direction, which prevents reducing agent deposits.

According to one refinement, the second transverse portion of the guide element may enclose an angle of between −10° and 30° with a tangent to the lateral surface which runs through a point of the exhaust-gas inlet opening belonging to the guide element and a plane perpendicular to the longitudinal direction. Preferably, the second transverse portion and the tangent may in this case enclose an angle of 0°, that is to say the second transverse portion is oriented substantially parallel to a transverse portion of the exhaust-gas inlet opening. Here, proceeding from a substantially parallel orientation, positive angles denote an inclination of the second transverse portion in the direction of the longitudinal axis—that is to say center—of the swirl generating device, and negative angles denote an inclination in the direction of the associated exhaust-gas inlet opening. The tangential component of the exhaust-gas flow in the interior of the swirl generating device can be reliably set in an advantageous manner.

According to a further aspect, the guide element may cover the exhaust-gas inlet opening in a radial direction such that, from the longitudinal axis of the swirl generating device, there is no direct line of sight outward in a radial direction through the exhaust-gas inlet opening. Furthermore or alternatively, a width, measured in a circumferential direction, of the guide element may be greater than a width, measured in a circumferential direction, of the associated exhaust-gas inlet opening, such that the guide element projects beyond the exhaust-gas inlet opening in a circumferential direction. In other words, the guide element may thus not only prevent a direct line of sight in a radial direction from the longitudinal axis of the swirl generating device to the exhaust-gas inlet opening but furthermore also covers parts of the lateral surface in a radial direction. This overlap, that is to say the extent of that part of the guide element which projects beyond the exhaust-gas inlet opening, may in this case preferably amount to up to one third of the width of the guide element. An inflow of exhaust gas in a radial direction is advantageously substantially prevented in this way, which leads, in the interior of the swirl generating device, to the formation of a homogeneous exhaust-gas flow which is directed substantially tangentially and/or in the direction of the second end of the swirl generating device and which is as far as possible uninfluenced by the external incident flow of exhaust gas and/or the operating point of the internal combustion engine. This advantageously promotes the mixing of exhaust gas and reducing agent and simultaneously prevents reducing agent deposits.

Furthermore, according to a further aspect of the present disclosure, the apparatus for admixing a liquid reducing agent to the exhaust gas of an internal combustion engine may comprise a protective device which is arranged in the region of the injector and which is in the form of a hollow body, preferably in the form of a frustum, and which serves for reducing an exhaust-gas flow in the region of the reducing agent spray jet, wherein the lateral surface of the protective device has a perforation formed preferably from circular apertures. The expression "perforation" may in this case refer to uniformly circumferentially distributed openings, wherein these may for example also be in the form of elongated apertures. Preferably, the protective device is arranged in the interior of the swirl generating device, particularly preferably in the interior and in a region of the first end of the swirl generating device. Furthermore, the protective device may be in the form of a funnel element which widens conically in the direction of the second end of the swirl generating device. It is advantageously possible by means of the protective device for an excessive centrifuging action on the reducing agent spray jet to be prevented in the vicinity of the injector, and thus for the risk of the formation of reducing agent deposits to be reduced.

According to a further aspect of the present disclosure, the apparatus may furthermore comprise an inner pipe which adjoins the second end of the swirl generating device, an outer pipe which surrounds the inner pipe, and at least one flow resistance which is arranged between the inner and outer pipes and which serves for regulating the exhaust-gas throughflow in the region between the inner and outer pipes. Here, the inner pipe and/or the outer pipe may have a circular cross section. By means of the arrangement just described, a bypass is advantageously realized, by means of which a fraction of the exhaust-gas flow can be conducted past the swirl generating device. In this way, the exhaust-gas flow that enters the swirl generating device can advantageously be regulated, and the occurrence of intense centrifuging forces in the interior of the swirl generating device, which would impair correct functioning, can be avoided.

According to one refinement of the above-stated aspect, the flow resistance may be formed by a reduction in size of the line cross section between the inner and outer pipes, preferably by a constriction of the outer pipe. This allows a flow resistance to be realized easily, without the use of further components. Furthermore or alternatively, the flow resistance may also be formed by a preferably annular multi-aperture plate. The flow resistance thereof may in this case be fixed or variable. For example, in the latter case, an aperture size and/or a number of apertures may be adjustable. This advantageously makes it possible for the exhaust-gas flow that is conducted past the swirl generating device to be varied, for example in a manner dependent on the engine operating point, whereby the most constant possible flow conditions can be attained in the interior of the swirl generating device even under different operating conditions.

According to a further aspect, the outer pipe may have a longer extent in an axial direction than the inner pipe, and may have a, preferably nozzle-like, constriction in a region in which the outer pipe does not surround the inner pipe. Here, a "constriction" can be understood to mean a local reduction in size of the flow cross section or pipe cross section. Preferably, here, the outer pipe may have the constriction on an end region averted from the injector. It is advantageously thus possible to attain a homogenization of the reducing agent distribution over the pipe cross section, which distribution would otherwise be annularly superelevated owing to the evaporation of the reducing agent from the inner pipe.

Also provided according to the present disclosure is a motor vehicle, preferably utility vehicle, having an internal combustion engine, preferably a diesel internal combustion engine, and having an apparatus for admixing a liquid reducing agent to the exhaust gas of the internal combustion engine, as described in this document. The liquid reducing agent may in this case be pure, water-free ammonia, aqueous ammonia, an aqueous solution of an ammonia precursor substance (for example urea, guanidium formiate, ammonium carbamate and/or ammonium formiate) and/or some other liquid that is suitable as reducing agent for SCR catalysis. Furthermore, the motor vehicle may comprise yet further components, including an exhaust-gas tract, a particle filter, and SCR catalytic converter and/or a tank for storing the reducing agent, including corresponding supply lines.

BRIEF DESCRIPTION OF THE DRAWINGS

Here, the above-describe aspects and features of the present disclosure may be combined with one another in any desired manner. Further details and advantages of the present disclosure will be described below with reference to the appended drawings, in which.

DETAILED DESCRIPTION

Figure 1:
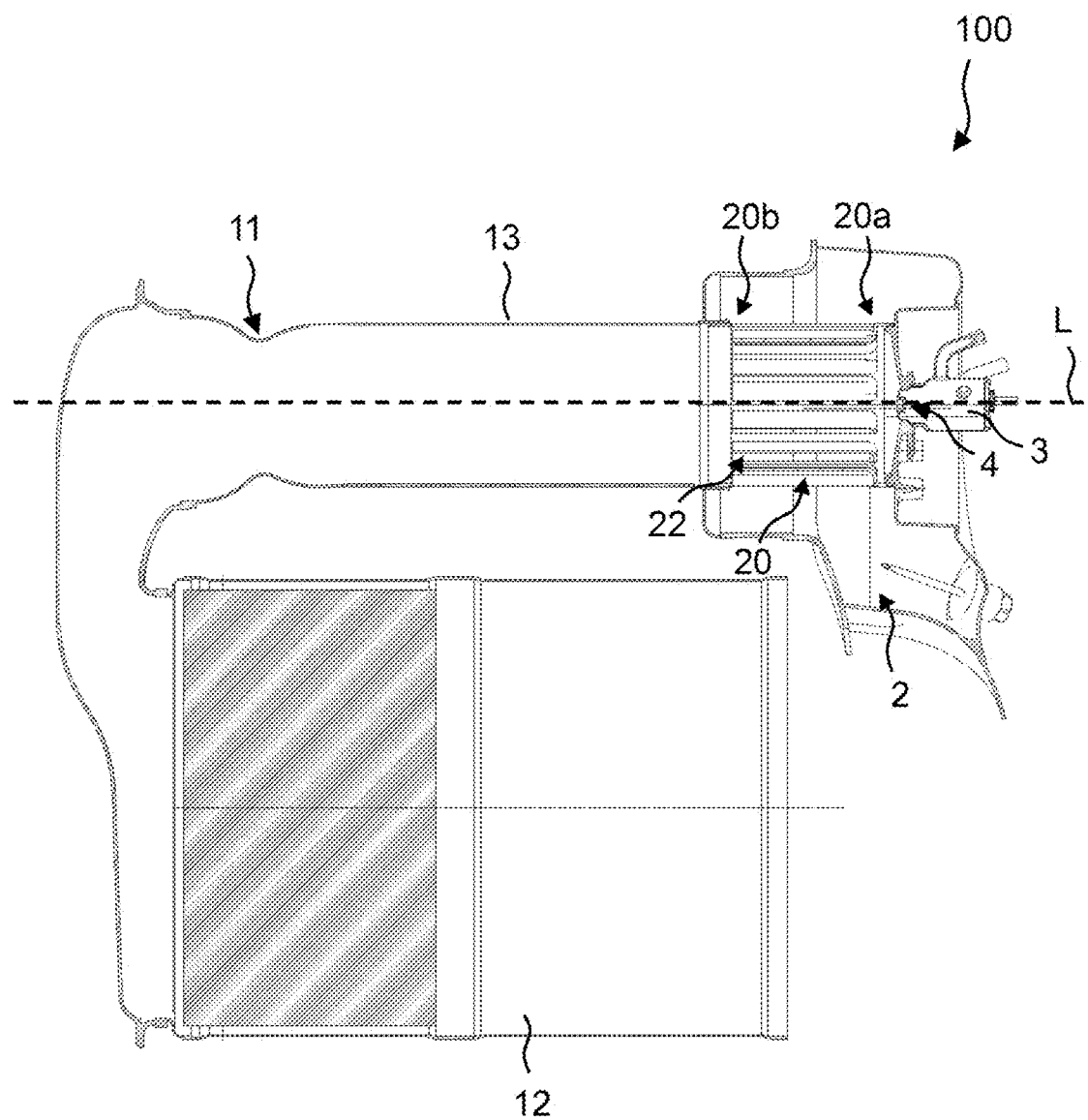
FIG. 1: is a schematic illustration of an exhaust-gas tract of an internal combustion engine having an apparatus for admixing a liquid reducing agent to the exhaust gas according to an embodiment of the present disclosure.

FIG. 1 is a schematic illustration of an exhaust-gas tract 2, that is to say exhaust-gas-conducting parts, of an internal combustion engine 1 which is not illustrated in any more detail here, preferably a diesel internal combustion engine. In the present case, the exhaust-gas tract 2 has an SCR catalytic converter 12 and an apparatus 100 according to the present disclosure for admixing a liquid reducing agent to the exhaust gas of the internal combustion engine 1, which apparatus is arranged in the exhaust-gas tract 2 in front, that is to say upstream, of the SCR catalytic converter 12. The liquid reducing agent may in this case be, for example, an aqueous urea solution which is hydrolyzed and converted into ammonia in the exhaust-gas tract, which ammonia is then fed together with the exhaust gas to the SCR catalytic converter 12.

Here, the apparatus 100 comprises a metering device 3 which is configured to generate a reducing agent spray jet by means of an injector 4, for example a single spray nozzle or a multi-aperture nozzle. It is preferable here for a rotationally symmetrical, for example conical spray jet to be generated. Furthermore, the apparatus 100 comprises a swirl generating device 20 which is formed as a hollow cylinder about a longitudinal axis L and which has a first end 20a facing toward the injector 4 and a second end 20b averted from the injector 4. Preferably, the swirl generating device 20 is in this case positioned downstream of the injector 4 such that the longitudinal axis L of the swirl generating device 20 coincides with the axis of rotation of the rotationally symmetrical reducing agent spray jet generated by the injector 4. Furthermore, the injector 4 may also be arranged within the swirl generating device 20, particularly preferably in a region of the first end 20a of the swirl generating device 20.

By means of the present apparatus 100—specifically by means of the embodiment of the swirl generating device 20 described in more detail below—it is possible in the interior of the swirl generating device 20 for a homogeneous exhaust-gas flow to be generated which is directed as far as possible tangentially and/or in the direction of the second end 20b of the swirl generating device 20, which exhaust-gas flow advantageously permits the most homogeneous possible mixing of reducing agent and exhaust gas. For this purpose, the swirl generating device 20 is closed at its first end 20a by means of a wall which has only one opening for the injection of the reducing agent spray jet for the injector 4. At its second end 20b, the swirl generating device 20 opens into a connecting pipe 13 which leads to the SCR catalytic converter 12. Furthermore, the lateral surface of the swirl generating device 20 comprises multiple uniformly circumferentially distributed exhaust-gas inlet openings 22 which extend substantially in a longitudinal direction. The lateral surface—also referred to as shell or shell wall—can in this case be understood to mean the entire region of the hollow body that is situated between the inner and outer surface. Via the exhaust-gas inlet openings 22, an incident flow of exhaust gas from the internal combustion engine 1 can enter the interior of the swirl generating device 20 and flow from there via the connecting pipe 13 to the SCR catalytic converter 12.

Figure 2:
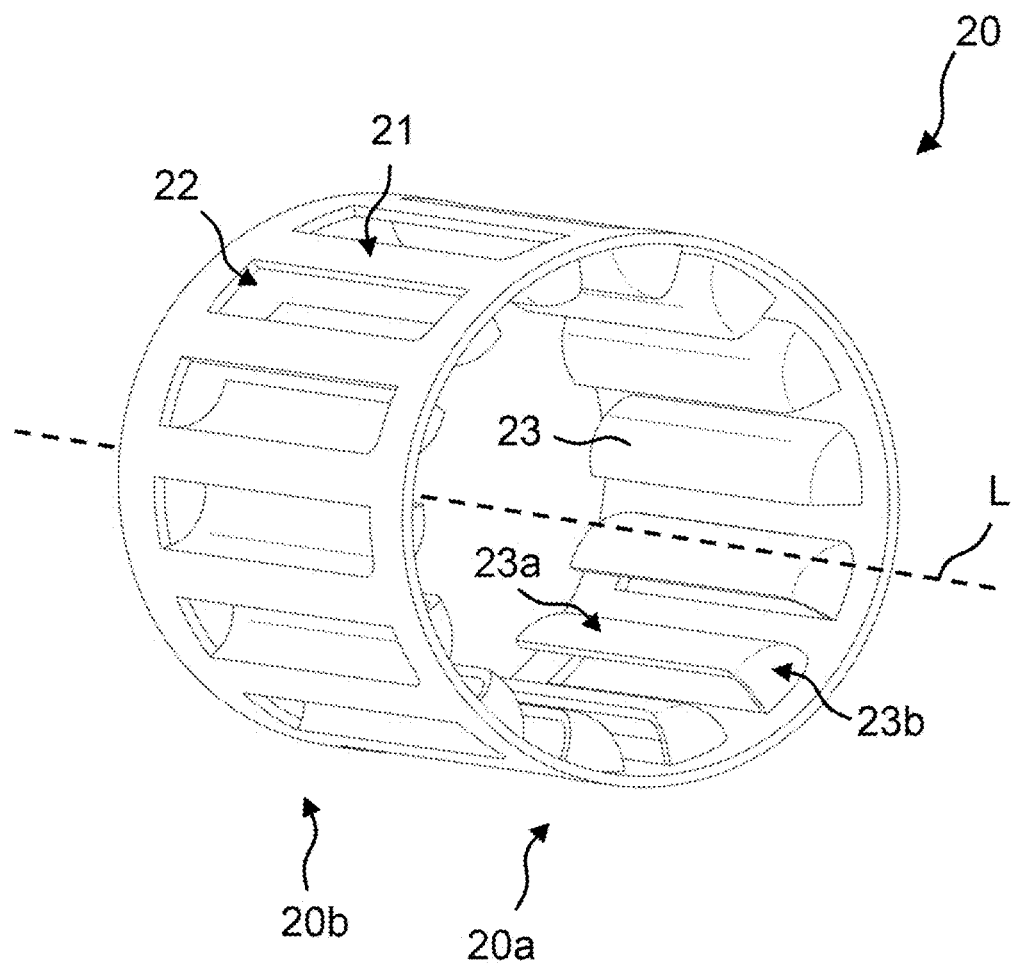
FIG. 2: is a 3D illustration of a swirl generating device according to an embodiment of the present disclosure.

In order to generate the abovementioned advantageous flow conditions when the exhaust-gas flow enters the swirl generating device 20, the swirl generating device 20 comprises guide elements 23 which are fitted adjacent to each exhaust-gas inlet opening 22 and which serves for diverting the exhaust-gas flow. Said guide elements 23 are illustrated, together with the entire swirl generating device 20, according to one embodiment of the present disclosure in a 3D illustration in FIG. 2. In the present case, the hollow cylindrical swirl generating device 20 has a number of fourteen uniformly circumferentially distributed rectangular exhaust-gas inlet openings 22 extending substantially in a longitudinal direction, and, adjacent to these, guide elements 23 which are fastened on two sides and which virtually completely cover or roof the exhaust-gas inlet openings 22 in a spaced-apart manner in the interior of the swirl generating device 20. Here, the guide elements 23 are closed by means of a connection to the lateral surface 21 in each case in the direction of the first end 20a of the swirl generating device 20, that is to say in the direction of the injector 4, and along a longitudinal edge of the exhaust-gas inlet openings 22. Along the other longitudinal edge of the exhaust-gas inlet openings 22, and in the direction of the second end 20b of the swirl generating device 20, the guide elements 23 are however open. Here, the expression "open" can be understood to mean that the end sides of the guide plate 23 are not connected to the lateral surface 21 in these directions. Correspondingly, in this context, the guide element 23 can also be referred to as a roof which is fastened on two sides and/or as a hood which is open on two sides. In other words, the guide element may thus be closed in an upstream direction and open in a downstream direction in relation to the exhaust-gas flow direction.

By means of this embodiment according to the disclosure of the guide elements 23, and in interaction with the respective exhaust-gas inlet openings 22, it is thus advantageously the case that, when the exhaust-gas flow enters through the exhaust-gas inlet opening 22 into the interior of the swirl generating device 20, a homogeneous exhaust-gas flow which is directed substantially tangentially and/or in the direction of the second end 20b of the swirl generating device 20 is generated, which is as far as possible uninfluenced by the external incident flow of exhaust gas and/or the operating point of the internal combustion engine 1. This advantageously promotes the mixing of exhaust gas and reducing agent, prevents reducing agent deposits, and furthermore ensures substantially symmetrically acting flow forces on the propagating reducing agent. Here, it is evident to a person skilled in the art that the swirl generating device 20 may self-evidently have more or fewer such functionally interacting units composed of exhaust-gas inlet opening 22 and guide element 23, without departing from the scope of the present disclosure.

Figure 3:
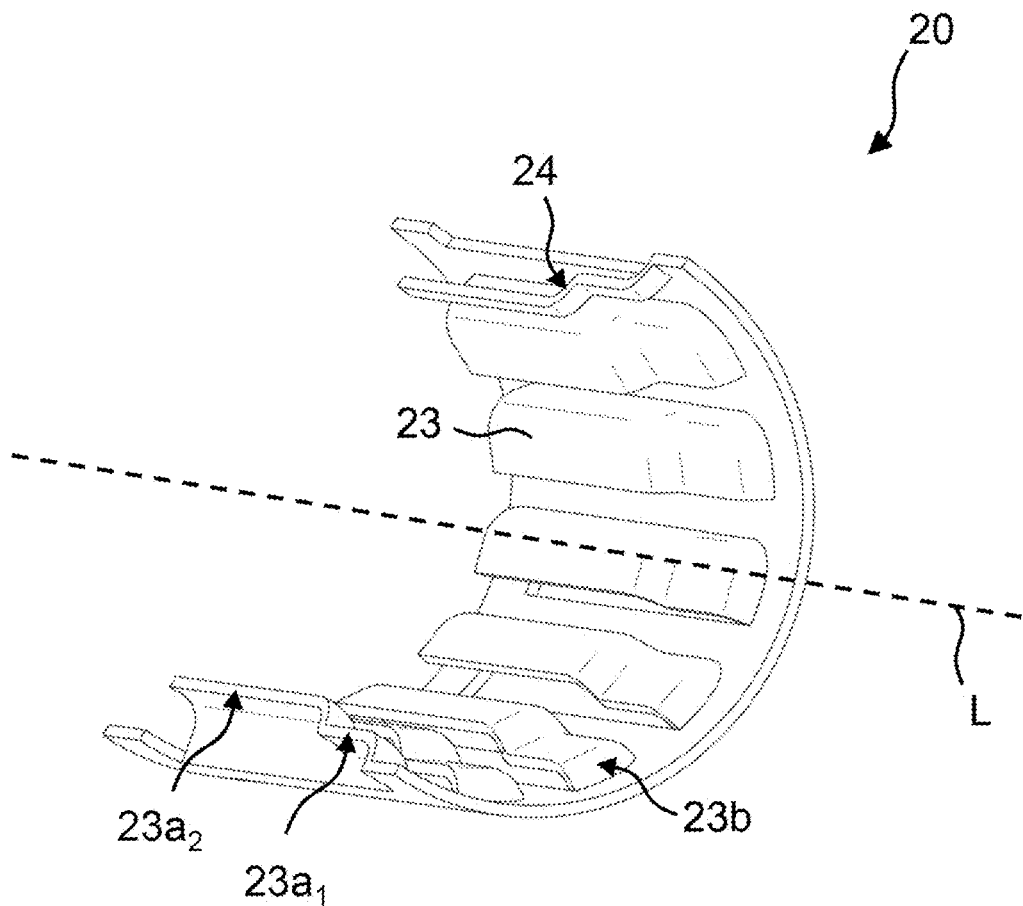
FIG. 3: is a 3D sectional illustration of a swirl generating device according to a second embodiment of the present disclosure.

FIG. 3 is a 3D sectional illustration of a swirl generating device 20 according to a second embodiment of the present disclosure. Here, too, the swirl generating device 20 is again in the form of a hollow cylinder with uniformly circumferentially distributed rectangular exhaust-gas inlet openings 22 extending substantially in a longitudinal direction. In the present case, by contrast to the variant shown in FIG. 2, the guide elements 23 which cover the exhaust-gas inlet openings 22 in a spaced-apart manner in the interior of the swirl generating device 20 are however stepped. This means that the respective guide elements 23 have in each case one first longitudinal portion $23a_1$ facing toward the injector 4 and one second longitudinal portion $23a_2$ averted from the injector 4, wherein the first longitudinal portion $23a_1$ has in each case a greater spacing to the longitudinal axis L of the swirl generating device 20 in a radial direction than the second longitudinal portion $23a_2$. This embodiment will be illustrated once again by the longitudinal section, shown in FIG. 4, of the second embodiment of the swirl generating device 20.

Figure 4:
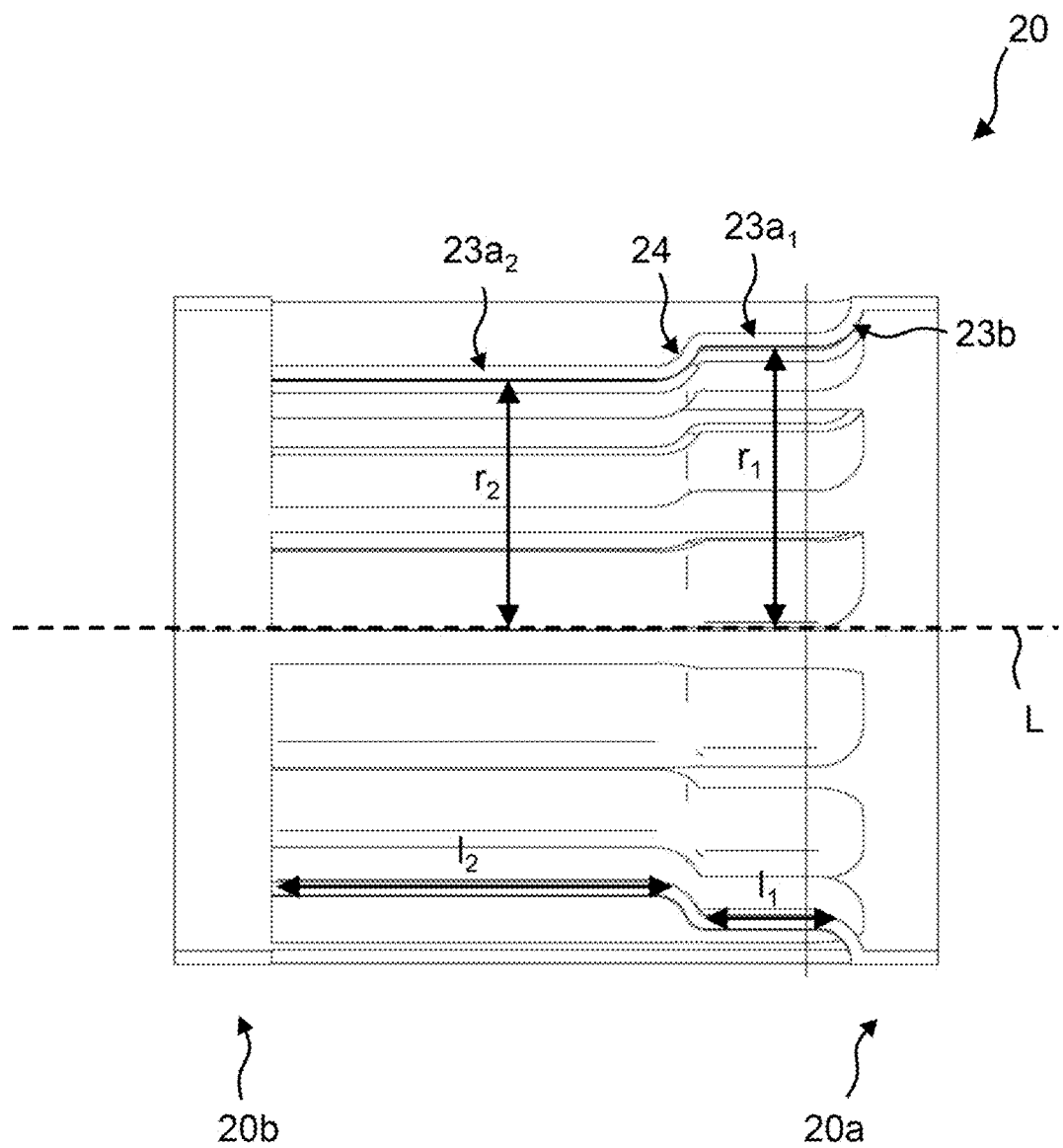
FIG. 4: shows a longitudinal section through the second embodiment of the swirl generating device illustrated in FIG. 3.

Here, $r_1$ denotes the radial spacing of the first longitudinal portion $23a_1$, and $r_2$ denotes the radial spacing of the second longitudinal portion $23a_2$, to the longitudinal axis L. The advantage of the greater radial spacing $r_1$ of the first longitudinal portion $23a_1$ lies here in the fact that, in this way, in the region of the first end 20a of the swirl generating device 20, and thus in the vicinity of the injector 4, it is possible to avoid high swirl or centrifuging forces on the reducing agent spray jet, and thus the risk of reducing agent deposits can be reduced. Furthermore, FIG. 4 shows that the transition between the first and second longitudinal portions $23a_1$, $23a_2$—analogously to the transition 23b between the lateral surface 21 and the first longitudinal portion $23a_1$—is realized in the form of a rounded step 24, that is to say without sharp-edged corners. In this way, it is advantageously ensured that, even in the transition region between the first and second wall regions $23a_1$, $23a_2$, there are no flow-stabilized sinks that could promote undesired deposits of reducing agent. Furthermore, FIG. 4 illustrates that a length $l_1$, measured in a longitudinal direction, of the first longitudinal portion $23a_1$ is shorter than a length $l_2$, measured in a longitudinal direction, of the second longitudinal portion $23a_2$. In the present case, the length $l_1$ amounts to one third of the length $l_2$, but it is evident to a person skilled in the art that any other length ratios between $l_1$ and $l_2$ may be selected without departing from the scope of the present disclosure. In addition, the guide elements 23 may each also comprise yet further steps, which may be of substantially identical or different form in relation to the illustrated step 24, or further longitudinal portions.

Figure 5:
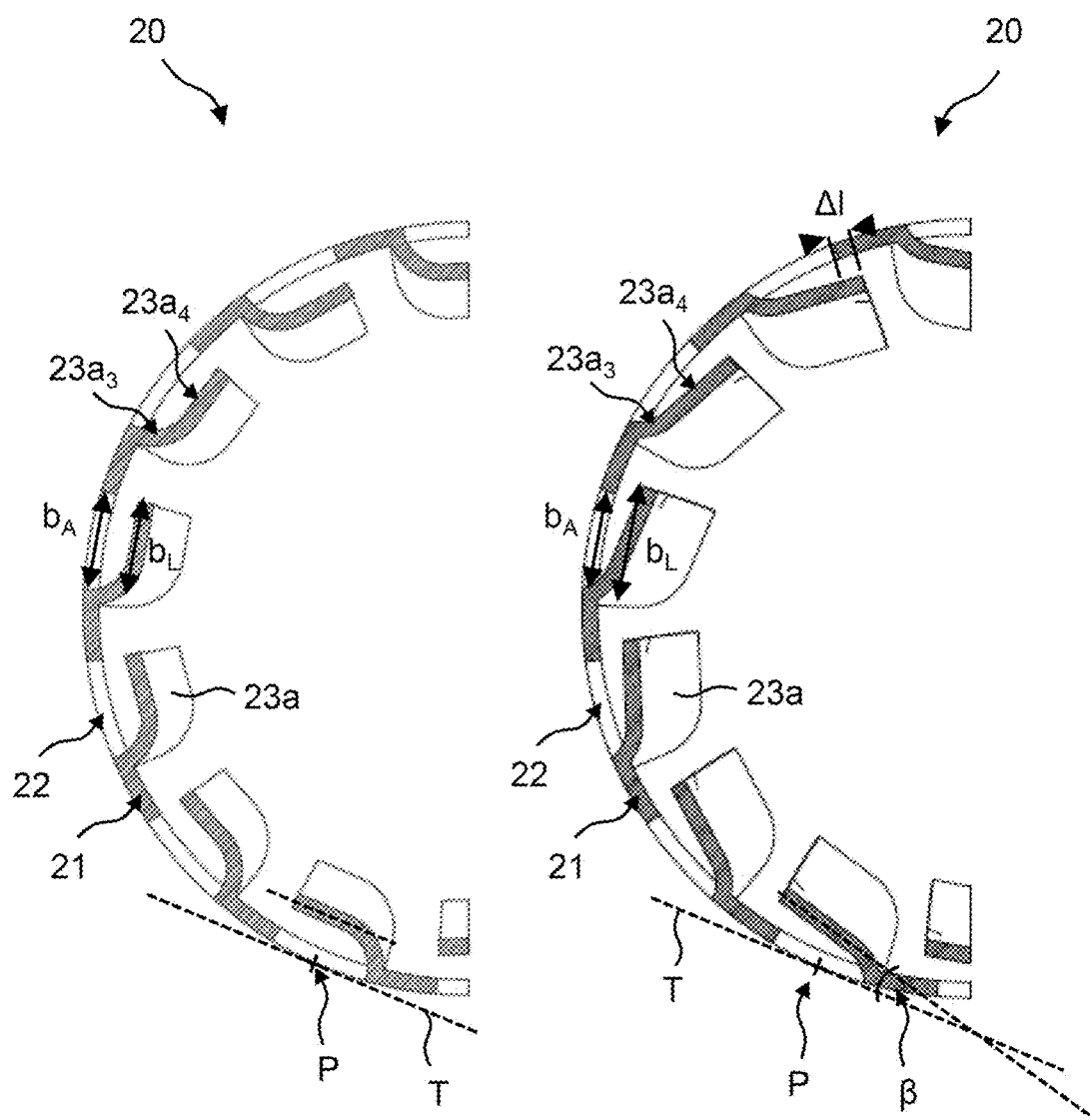
FIG. 5: shows in each case one partial cross section through the swirl generating device in a plane perpendicular to the longitudinal axis, according to two embodiments of the present disclosure.

FIG. 5 shows, of two embodiments of the present disclosure, in each case a partial cross section of the swirl generating device 20 in a plane perpendicular to the longitudinal axis L. In both cases, the respective guide elements 23—more specifically the first wall region 23a of the respective guide elements 23—comprise a curved first transverse portion $23a_3$, which is connected to the lateral surface 21, and a substantially straight second transverse portion $23a_4$, which adjoins the first transverse portion $23a_3$ and which covers the exhaust-gas inlet opening 22 in a spaced-apart manner. Here, the embodiments illustrated on the left and on the right differ in terms of the inclination and width of the second transverse portions $23a_4$.

Whereas, in the left-hand case, the second transverse portion $23a_4$ of the respective guide elements 23 is oriented substantially parallel to a transverse portion of the associated exhaust-gas inlet opening 22, in the right-hand case the second transverse portion $23a_4$ is inclined into the interior of the swirl generating device 20, that is to say in the direction of the longitudinal axis L. This inclination can also be quantified in terms of a tangent T to the associated exhaust-gas inlet opening 22. For this purpose, the angle $\beta$ between the second transverse portion $23a_4$ of the guide element 23 and a tangent T to the lateral surface 21 which runs through a point P of the exhaust-gas inlet opening 22 belonging to the guide element 23 in the corresponding cross-sectional plane can be determined. In the left-hand exemplary embodiment, owing to the parallelism, there is an angle $\beta$ of 0°, whereas, in the right-hand exemplary embodiment, an angle $\beta$ of +13° is illustrated. Here, a positive angle $\beta$ may denote an inclination of the second transverse portion $23a_4$ in the direction of the longitudinal axis L—that is to say center—of the swirl generating device 20, and a negative angle $\beta$ may denote an inclination in the direction of the associated exhaust-gas inlet opening 22. In order to advantageously be able to reliably set the tangential component of the exhaust-gas flow that forms in the interior when a flow of exhaust gas is incident on the swirl generating device 20, the angle $\beta$ may preferably amount to between −10° and +30°.

In addition to the different inclination of the second transverse portions $23a_4$ of the guide elements 23, the exemplary embodiments illustrated on the left and on the right furthermore also differ in terms of their width $b_L$ measured in a circumferential direction. Whereas, in the left-hand case, the width $b_L$ of the guide element 23 substantially corresponds to the width $b_A$, measured in a circumferential direction, of the associated exhaust-gas inlet opening 22, in the right-hand exemplary embodiment the guide element 23 has a greater width $b_L$ than the associated exhaust-gas inlet opening 22. Correspondingly, in the right-hand case, the second transverse portion $23a_4$ of the guide elements 23 projects beyond the associated exhaust-gas inlet opening 22 with the overlap Δl. In other words, the respective guide elements 23 may thus not only prevent a direct line of sight in a radial direction from the longitudinal axis L of the swirl generating device 20 to the respectively associated exhaust-gas inlet opening 22 (left-hand case), but may furthermore also cover parts of the lateral surface 21 in a radial direction (right-hand case). Thus, the inflow of exhaust gas in a radial direction is advantageously substantially prevented, which, in the interior of the swirl generating device 20, induces the formation of a homogeneous exhaust-gas flow which is directed substantially tangentially and/or in the direction of the second end 20b of the swirl generating device 20.

Figure 6:
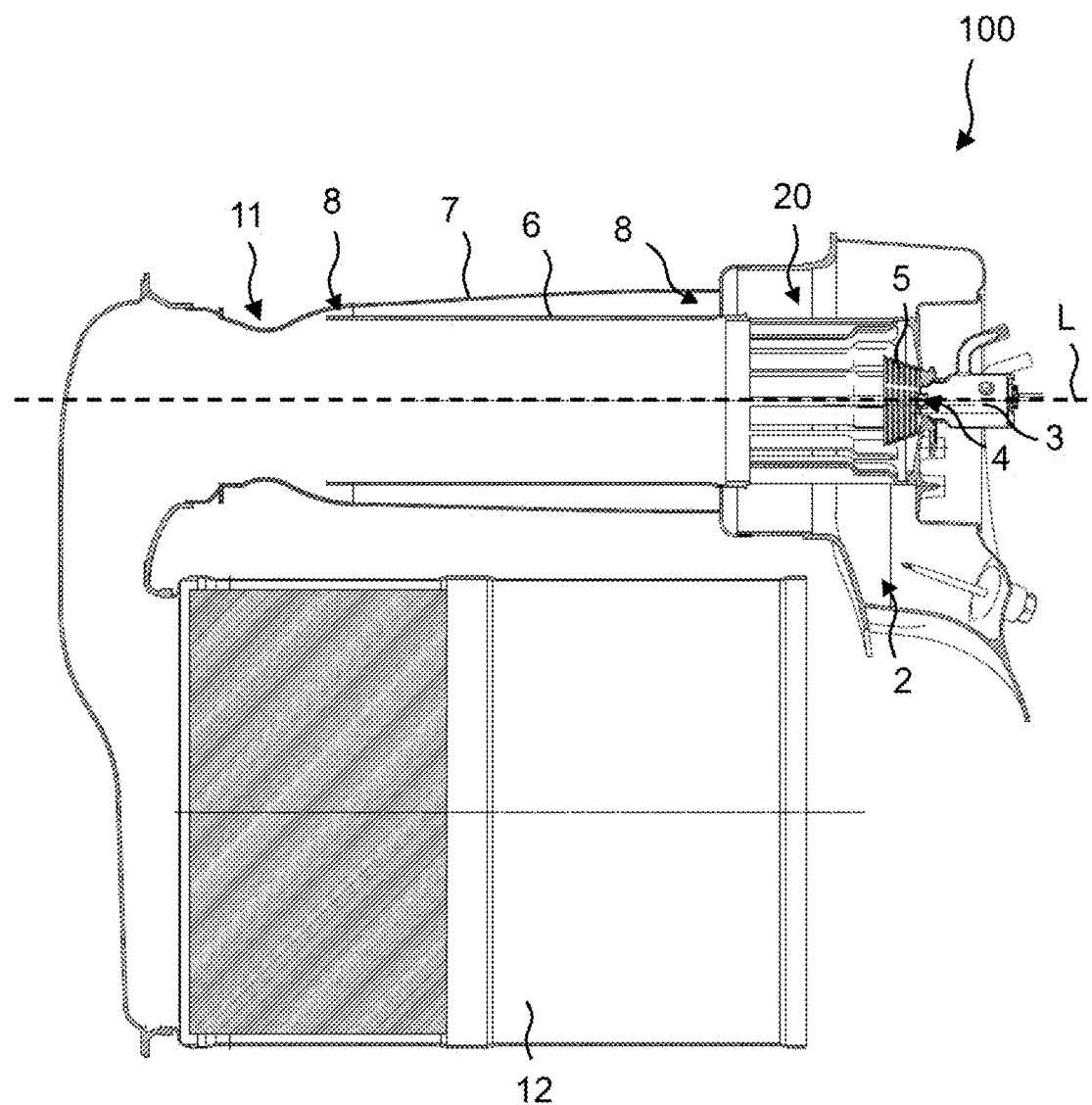
FIG. 6: is a schematic illustration of an exhaust-gas tract of an internal combustion engine having an apparatus for admixing a liquid reducing agent to the exhaust gas according to a further embodiment of the present disclosure.

FIG. 6 is a schematic illustration of an exhaust-gas tract 2 of an internal combustion engine 1 having an apparatus 100 for admixing a liquid reducing agent to the exhaust gas according to a further embodiment of the present disclosure. By contrast to the case illustrated in FIG. 1, the apparatus 100 here comprises a swirl generating device 20 with stepped guide elements 23, as have been described in detail above with reference to FIGS. 3 and 4. Furthermore, the apparatus 100 comprises a protective device 5 which is arranged in the region of the injector 4 and which is in the form of a perforated frustum and which serves for reducing an exhaust-gas flow in the region of the reducing agent spray jet. Aside from the perforation, shown in the present case, in the form of uniformly circumferentially distributed circular apertures, the openings or apertures of the protective device 5 may alternatively also be elongated apertures. Furthermore, additional guide elements, for example webs, may also be attached to the lateral surface of the protective device 5 without departing from the scope of the present disclosure. Preferably, the protective device 5 is furthermore arranged in the interior of the swirl generating device 20, particular preferably in the interior and in a region of the first end 20a of the swirl generating device 20. Here, the protective device 5 may be positioned downstream of the injector 4 and/or arranged such that the injector 4 can spray the reducing agent spray jet into the interior of the protective device 5. By means of the protective device 5, in the vicinity of the injector 4, an excessive centrifuging action on the reducing agent spray jet can advantageously be prevented, and thus the risk of the formation of reducing agent deposits can be reduced.

As a further difference in relation to the embodiment shown in FIG. 1, the apparatus 100 illustrated in FIG. 6 additionally has a bypass by means of which a fraction of the exhaust-gas flow can be conducted past the swirl generating device 20. In this way, it is advantageously possible for the exhaust-gas flow entering the swirl generating device 20 to be regulated, and for the occurrence of intense centrifuging forces in the interior of the swirl generating device 20, which would impair correct functioning, to be avoided. To form the bypass, the apparatus 100 comprises an inner pipe 6, which adjoins the second end 20b of the swirl generating device 20 and which can also be referred to as mixing pipe, and an outer pipe 7, which surrounds the inner pipe 6 and which has a longer extent in an axial direction than the inner pipe 6. In the present case, both the inner pipe 6 and the outer pipe 7 have a circular cross section, wherein the diameter of the outer pipe 7 decreases over the length thereof in the direction of the end averted from the injector 4. Alternatively, it is however also possible for the inner pipe 6 and outer pipe 7 to have an unchanging diameter or cross section. Altogether, it is thus possible for the incident flow of exhaust gas from the internal combustion engine 1 to pass in the direction of the SCR catalytic converter 12 via two paths. On the one hand, exhaust gas may enter via the exhaust-gas inlet openings 22 into the interior of the swirl generating device 20 and flow from there through the inner pipe 6, alternatively the exhaust gas may also flow past the swirl generating device 20 and subsequently through the region between the outer and inner pipes 6, 7.

Figure 7:
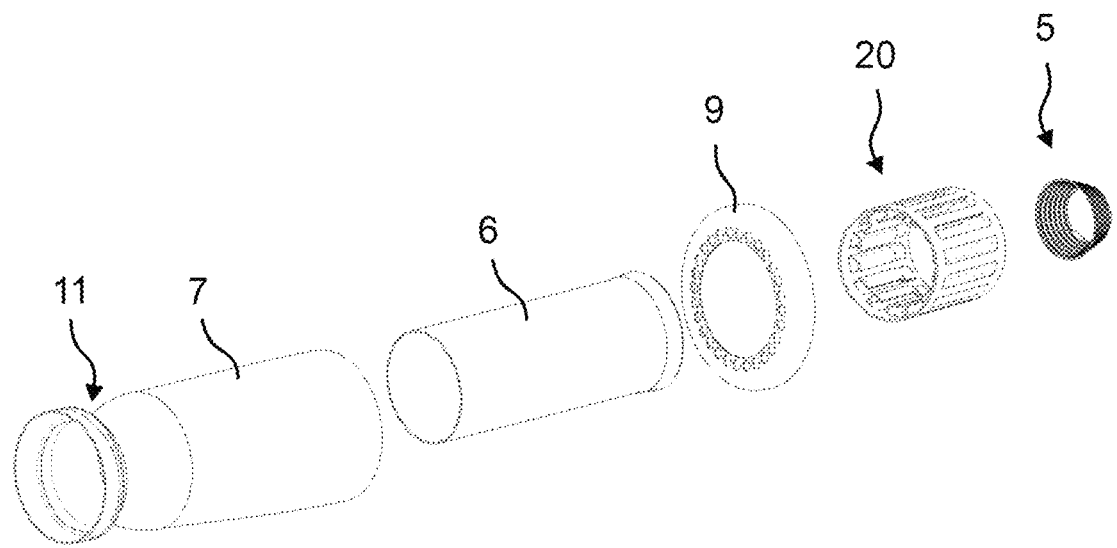
FIG. 7: is an exploded illustration of the apparatus illustrated in FIG. 6.

In order, here, to regulate the fraction of exhaust gas that flows through the swirl generating device 20 and the fraction of exhaust gas that is conducted past the swirl generating device 20, the apparatus 100 furthermore comprises two flow resistances 8 which are arranged between the inner and outer pipes 6, 7. Here, one of the two flow resistances 8 is formed by the narrowing cross section of the outer pipe 8, and the other flow resistance 8 is formed by an annular multi-aperture plate 9, which can be seen more clearly in the exploded illustration of the embodiment shown in FIG. 7. Aside from the regulation of the exhaust-gas flow that forms in the interior of the swirl generating device 20, the exhaust-gas flow that is conducted between the inner and outer pipes 6, 7 furthermore also homogeneously warms the inner pipe 6, which leads to the evaporation of reducing agent that possibly impinges on the inner pipe 6, and thus likewise prevents deposits of reducing agent. Since the evaporating reducing agent would result in an annularly elevated concentration over the pipe cross section, the outer pipe 7, in order to homogenize the reducing agent distribution, has a nozzle-like constriction 11 in an end region which is averted from the injector 4 and in which the outer pipe 7 does not surround the inner pipe 6. In this way, the reducing agent distribution is again concentrated in the pipe center, whereby a more homogeneous distribution of the reducing agent in the downstream exhaust-gas tract, and in particular upstream at the SCR catalytic converter, is advantageously attained.

Figure 8:
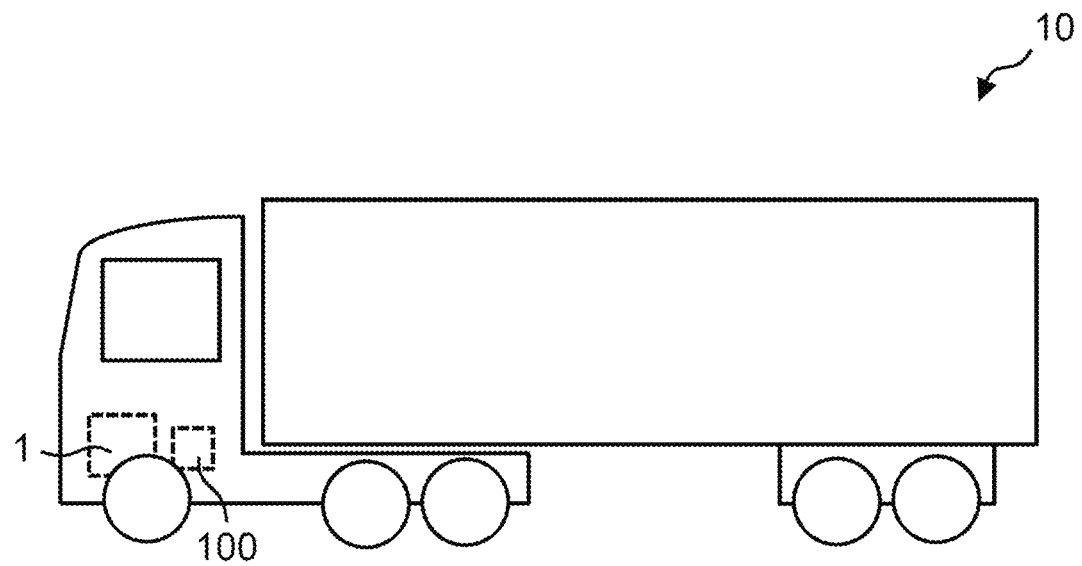
FIG. 8: is a schematic illustration of a motor vehicle according to an embodiment of the present disclosure.

FIG. 8 shows a motor vehicle 10 having an internal combustion engine 1, preferably a diesel internal combustion engine, and having an apparatus 100 for admixing a liquid reducing agent to the exhaust gas of the internal combustion engine 1 according to an embodiment of the present disclosure. In the present case, the motor vehicle 10 is a utility vehicle in the form of a heavy goods vehicle. The motor vehicle 10 may furthermore also comprise yet further components (not illustrated in any more detail), including an exhaust-gas tract, an SCR catalytic converter 12, a tank for storing the reducing agent, and corresponding supply lines.

Although the present disclosure has been described with reference to particular exemplary embodiments, it is evident to a person skilled in the art that various modifications may be made, and equivalents used as substitutes, without departing from the scope of the present disclosure. It is consequently the intention for the present disclosure not to be limited to the exemplary embodiments disclosed, but to comprise all exemplary embodiments that fall within the scope of the appended patent claims. In particular, the present disclosure also claims protection for the subject matter and the features of the subclaims independently of the claims to which said subclaims refer back.

LIST OF REFERENCE DESIGNATIONS

1 Internal combustion engine
2 Exhaust-gas tract
3 Metering device
4 Injector
5 Protective device
6 Inner pipe
7 Outer pipe 8 Flow resistance
9 Multi-aperture plate
10 Motor vehicle
11 Constriction
12 SCR catalytic converter
13 Connecting pipe
20 Swirl generating device
20a First end of the swirl generating device
20b Second end of the swirl generating device
21 Lateral surface
22 Exhaust-gas inlet opening
23 Guide element
23a First wall region of the guide element
$23a_1$ First longitudinal portion
$23a_2$ Second longitudinal portion
$23a_3$ First transverse portion
$23a_4$ Second transverse portion
23b Second wall region of the guide element
24 Step
100 Apparatus for admixing a liquid reducing agent to the exhaust gas of an internal combustion engine
$b_A$ Width of the exhaust-gas inlet opening
$b_L$ Width of the guide element
$l_1$ Length of the first longitudinal portion
$l_2$ Length of the second longitudinal portion
$r_1$ Spacing of the first longitudinal portion to the longitudinal axis
$r_2$ Spacing of the second longitudinal portion to the longitudinal axis
L Longitudinal axis
P Point
T Tangent
β Angle
Δl Overlap

What is claimed is:

1. An apparatus for admixing a liquid reducing agent to the exhaust gas of an internal combustion engine, comprising
   a) a metering device which is arranged in an exhaust-gas tract of the internal combustion engine and which is configured to generate a reducing agent spray jet by means of an injector,
   b) a swirl generating device which is in the form of a hollow body about a longitudinal axis and which has a first end facing toward the injector and a second end averted from the injector,
wherein the lateral surface of the swirl generating device comprises at least
   b1) one exhaust-gas inlet opening extending substantially in a longitudinal direction, and
   b2) one guide element which is fitted adjacent to the exhaust-gas inlet opening and which at least partially covers the exhaust-gas inlet opening in a spaced-apart manner in the interior of the swirl generating device and which serves for diverting an exhaust-gas flow,
wherein the guide element is closed in the direction of the first end of the swirl generating device and is open in the direction of the second end of the swirl generating device.

2. The apparatus as claimed in claim 1, wherein the guide element is connected to the lateral surface along a longitudinal edge and a transverse edge, facing toward the first end of the swirl generating device, of the exhaust-gas inlet opening, in order to thus, when the exhaust-gas flow enters the interior of the swirl generating device through the exhaust-gas inlet opening, generate there an exhaust-gas flow which is directed substantially tangentially and/or in the direction of the second end of the swirl generating device.

3. The apparatus as claimed in claim 1, wherein the guide element comprises the following regions:
   a) a first wall region which at least partially covers the exhaust-gas inlet opening in a spaced-apart manner, and
   b) a second wall region which connects the first wall region to the lateral surface in the direction of the first end of the swirl generating device and thus closes the guide element in that direction.

4. The apparatus as claimed in claim 3, wherein the second wall region
   a) has a curvature and/or
   b) adjoins the first wall region at an angle not equal to 90°.

5. The apparatus as claimed in claim 3, wherein the first wall region
   a) has a first longitudinal portion facing toward the injector and
   b) has a second longitudinal portion averted from the injector,
wherein the first longitudinal portion has a greater spacing to the longitudinal axis of the swirl generating device in a radial direction.

6. The apparatus as claimed in claim 5, wherein a length, measured in a longitudinal direction, of the first longitudinal portion is shorter than a length, measured in a longitudinal direction, of the second longitudinal portion.

7. The apparatus as claimed in claim 5, wherein the guide element comprises, between the first and second longitudinal portions,
   a) two or more steps and/or
   b) further longitudinal portions which have a spacing to the longitudinal axis of the swirl generating device in a radial direction, which spacing differs from the spacing of the first and second longitudinal portions.

8. The apparatus as claimed in claim 3, wherein the first wall region comprises
   a) a curved first transverse portion, which is connected to the lateral surface, and
   b) a substantially straight second transverse portion which adjoins the first transverse portion.

9. The apparatus as claimed in claim 8, wherein the curved first transverse portion is integrally formed on an edge region of the exhaust-gas inlet opening.

10. The apparatus as claimed in claim 8, wherein the second transverse portion of the guide element encloses an angle of between −10° and 30° with a tangent to the lateral surface which runs through a point of the exhaust-gas inlet opening belonging to the guide element and a plane perpendicular to the longitudinal direction.

11. The apparatus as claimed in claim 1, wherein
   a) the guide element covers the exhaust-gas inlet opening in a radial direction such that, from the longitudinal axis of the swirl generating device, there is no direct line of sight outward in a radial direction through the exhaust-gas inlet opening, and/or
   b) in that a width, measured in a circumferential direction, of the guide element is greater than a width, measured in a circumferential direction, of the associated exhaust-gas inlet opening, such that the guide element projects beyond the exhaust-gas inlet opening in a circumferential direction.

12. The apparatus as claimed in claim 1, further comprising a protective device which is arranged in the region of the injector and which is in the form of a hollow body and which serves for reducing an exhaust-gas flow in the region of the reducing agent spray jet, the lateral surface of which protective device has a perforation formed preferably from circular holes.

13. The apparatus as claimed in claim 12, wherein the hollow body of the protective device is in the form of a frustum.

14. The apparatus as claimed in claim 1, further comprising
a) an inner pipe which adjoins the second end of the swirl generating device,
b) an outer pipe which surrounds the inner pipe, and
c) at least one flow resistance which is arranged between the inner and outer pipes and which serves for regulating the exhaust-gas throughflow in the region between the inner and outer pipes.

15. The apparatus as claimed in claim 14, wherein
a) the inner pipe has a circular cross section, and/or
b) the outer pipe has a circular cross section.

16. The apparatus as claimed in claim 14, wherein the flow resistance is formed
a) by a reduction in size of the line cross section between the inner and outer pipes by a constriction of the outer pipe, and/or
b) by an annular multi-hole aperture.

17. The apparatus as claimed in claim 14, wherein
a) the outer pipe has a longer extent in an axial direction than the inner pipe, and
b) has a constriction in a region in which the outer pipe does not surround the inner pipe.

18. The apparatus as claimed in claim 1, wherein the liquid reducing agent is an aqueous urea solution.

19. A motor vehicle having an internal combustion engine and an apparatus for admixing a liquid reducing agent to an exhaust gas of the internal combustion engine as claimed in claim 1.

20. The motor vehicle of claim 19 wherein
a) the motor vehicle is a utility vehicle, and/or
b) the internal combustion engine is a diesel internal combustion engine, and/or the liquid reducing agent is an aqueous urea solution.

* * * * *